United States Patent
McKinley et al.

(10) Patent No.: US 8,610,935 B1
(45) Date of Patent: Dec. 17, 2013

(54) PRINTING AND SCANNING USING MOBILE DEVICES

(75) Inventors: Patrick A. McKinley, Corvallis, OR (US); Brian Mahaffy, Boise, ID (US)

(73) Assignee: Marvell International Ltd., Hamilton (BM)

( * ) Notice: Subject to any disclaimer, the term of this patent is extended or adjusted under 35 U.S.C. 154(b) by 176 days.

(21) Appl. No.: 13/093,628

(22) Filed: Apr. 25, 2011

Related U.S. Application Data (60) Provisional application No. 61/346,832, filed on May 20, 2010, provisional application No. 61/393,784, filed on Oct. 15, 2010.

(51) Int. Cl.
*G06F 15/00* (2006.01)
(52) U.S. Cl.
USPC .......................................... 358/1.15
(58) Field of Classification Search
USPC .......................................... 358/1.15
See application file for complete search history.

(56) References Cited

U.S. PATENT DOCUMENTS

| | | | | |
|---|---|---|---|---|
| 2004/0133636 | A1* | 7/2004 | Kinoshita et al. | 709/203 |
| 2005/0062998 | A1* | 3/2005 | Kumashio | 358/1.14 |
| 2006/0279760 | A1* | 12/2006 | Wang et al. | 358/1.14 |
| 2008/0137131 | A1* | 6/2008 | Cavill et al. | 358/1.15 |
| 2010/0002251 | A1* | 1/2010 | Tachibana | 358/1.15 |

FOREIGN PATENT DOCUMENTS

JP 2004-139158 * 5/2004

OTHER PUBLICATIONS

Machine translation for JP2004-139158.*

* cited by examiner

*Primary Examiner* — Qian Yang (57) ABSTRACT

Embodiments of the present disclosure provide a method comprising transmitting, by a mobile device, a print request to a print server to print a file; in response to transmitting the print request, displaying on the mobile device a bar code, wherein the bar code embeds information associated with the print request; and scanning the bar code from the mobile device to a printing device, to facilitate subsequent printing of the file by the printing device based on the information embedded in the bar code.

14 Claims, 9 Drawing Sheets

PRINTING AND SCANNING USING MOBILE DEVICES

CROSS REFERENCE TO RELATED APPLICATIONS

The present application claims priority to U.S. Patent Application No. 61/346,832, filed May 20, 2010, and to U.S. Patent Application No. 61/393,784, filed Oct. 15, 2010, the entire specifications of which are hereby incorporated by reference in their entirety for all purposes, except for those sections, if any, that are inconsistent with this specification.

TECHNICAL FIELD

Embodiments of the present disclosure relate to the field of printing and scanning, and more particularly, to printing from a mobile device and scanning to a mobile device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A mobile device is generally a hand-held computing device that typically has a display screen and/or a miniature keyboard for receiving input from a user. Examples of mobile devices include cellular phones, mobile phones, smart phones, personal digital assistants (PDA), and the like. Mobile devices are generally able to perform many functions of a conventional computer including, for example, connecting to a network, receiving and transmitting e-mails, and downloading files. However, a mobile device may not have the ability to open or render on a display some of the files downloaded to the mobile device due to, for example, lack of appropriate application programs installed in the mobile device. For example, although a mobile device may be able to download a Microsoft Word® file, the mobile device may not be able to open the file or display the file on its display (e.g., because a full version of Microsoft Word® is not installed in the mobile device). Furthermore, mobile devices do not generally have an inherent connection to a printer. For at least these reasons, it is generally not possible to print various files from mobile devices.

Similarly, due to lack of a connection between a scanner and a mobile device and/or due to lack of a proper application program installed in the mobile device, it is generally not possible to scan a document, and upload and view the scanned document in the mobile device.

SUMMARY

The present disclosure provides a method comprising transmitting, by a mobile device, a print request to a print server to print a file; in response to transmitting the print request, displaying on the mobile device a bar code, wherein the bar code embeds information associated with the print request; and scanning the bar code from the mobile device to a printing device, to facilitate subsequent printing of the file by the printing device based on the information embedded in the bar code. The bar code embeds identification information associated with one or more of the print server and the file. The method further comprises scanning the bar code to the printing device, to facilitate the printing device to transmit another print request to the print server, in response to transmitting the another print request, receive a formatted version of the file from the print server, and print the formatted version of the file.

In an embodiment, scanning the bar code further comprises scanning the bar code to the printing device, to facilitate the print server to receive another print request from the printing device; in response to receiving the another print request, open and format the file for printing the file in the printing device; and transmit the formatted file to the printing device. The print request includes the file or includes location information of the file. The print request includes one or more print options associated with printing the file. In an embodiment, the print request is a first print request, the file is a first file, the method further comprises transmitting, by the mobile device, a second print request to the print server to print a second file; and scanning the bar code from the mobile device to the printing device, to facilitate the printing device to communicate with the print server and print the second file. In an embodiment, the print request is a first print request, the file is a first file, the bar code is a first bar code, the method further comprises transmitting, by the mobile device, a second print request to the print server to print a second file; in response to transmitting the second print request, displaying on the mobile device a second bar code; and scanning the second bar code from the mobile device to the printing device, to facilitate the printing device to communicate with the print server and print the second file. The method further comprises generating a password associated with the print request; and in response to scanning the bar code, inputting the password in the printing device, to facilitate authentication of the printing device to the print server.

There is also provided a method comprising transmitting, by a mobile device, a scan request to a scan server to scan a document; in response to transmitting the scan request, displaying on the mobile device a bar code; scanning the bar code from the mobile device to a scanning device, to facilitate the scanning device to scan the document and transmit the scanned document to the scan server; and receiving a formatted version of the scanned document from the scan server. The scan request includes one or more scan options associated with scanning the file. In an embodiment, the scan request identifies at least one application program, which can be used to open and view the formatted version of the scanned document in the mobile device. The bar code embeds identification information associated with the scan server and a scan job identification associated with the scan request. In an embodiment, the formatted version of the scanned document is in a format that can be opened and viewed on the mobile device. In an embodiment, the scan request is a first scan request, the document is a first document, the method further comprises transmitting, by the mobile device, a second scan request to the scan server; scanning the bar code from the mobile device to the scanning device, to facilitate the scanning device to scan a second document and transmit the scanned document to the scan server; and receiving a formatted version of the scanned second document from the scan server. The scan request is a first scan request, the document is a first document, the bar code is a first bar code, the method further comprises transmitting, by the mobile device, a second scan request to the scan server; in response to transmitting the second scan request, displaying on the mobile device a second bar code; scanning the second bar code from the mobile device to the scanning device, to facilitate the scanning device to scan a second document and transmit the scanned second document to the scan server; and receiving a formatted version of the scanned second document from the scan server.

There is also provided a method comprising scanning, by a multi-function printer, a bar code from a mobile device; in response to scanning the bar code, transmitting, by the multi-function printer, a print request to a print server; in response to transmitting the print request, receiving a file from the print server; and printing the received file. The method further comprises in response to scanning the bar code, determining, from the scanned bar code, a network path of the print server and a print job identification. The method further comprises receiving a password associated with the bar code; and transmitting the password to the print server along with the print request, to facilitate authentication of the multi-function printer with the print server. The method further comprises in response to transmitting the print request, receiving another file from the print server; and printing the another file.

There is also provided a method comprising recording, by a mobile device, an image of a bar code associated with a printing device that is selected for printing from the mobile device; based at least in part on the image, determining, by the mobile device, identification information of the printing device; and based at least in part on the identification information, printing, by the mobile device, to the printing device. The identification information of the printing device includes a Uniform Resource Identifier of the printing device. In an embodiment, the printing to the printing device further comprises transmitting a print job from the mobile device to the Uniform Resource Identifier of the printing device. The recording the image of the bar code further comprises taking a picture of the bar code from a display of the printing device. The recording the image of the bar code further comprises taking a picture of the bar code from a configuration page of the printing device.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the teachings of the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Figure 1:
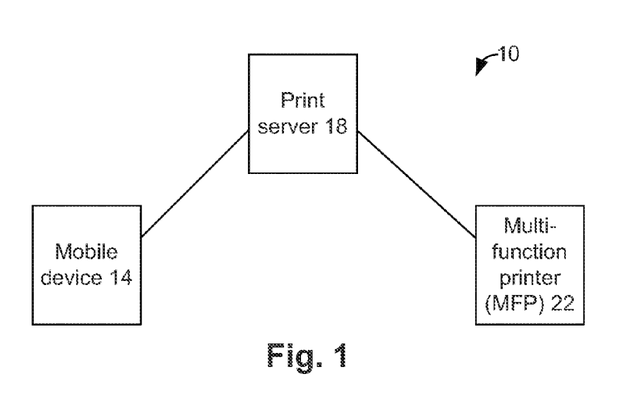
FIG. 1 schematically illustrates a printing system including a mobile device, a print server, and a multi-function printer (MFP), in accordance with various embodiments of the present disclosure.

FIG. 1 schematically illustrates a printing system 10 including a mobile device 14, a print server 18, and a multi-function printer (MFP) 22, in accordance with various embodiments of the present disclosure. The mobile device 14 can be any appropriate mobile device, e.g., a mobile phone, a cellular phone, a smart phone, a personal digital assistant (PDA), or the like. In an embodiment, the mobile device 14 is configured to connect a network, e.g., the Internet, a local area network (LAN), a wireless LAN (WLAN), a personal area network (PAN), and/or the like.

The mobile device 14 is operatively coupled to, and communicates with the print server 18. In an embodiment, the mobile device 14 is operatively coupled to the print server 18 through a network, e.g., the Internet, a LAN, a WLAN, a PAN, and/or the like. As an example, if the mobile device 14 is used by an employee of a corporation, the print server 18 may be within a LAN of the corporation (e.g., the mobile device 14 accesses the print server 18 without having to cross a firewall used by the LAN of the corporation). In another example, the print server 18 is a web based print server and/or is located remotely from the mobile device 14, and the mobile device 14 accesses the print server 18 over the Internet.

The MFP 22 is configured to provide multiple services, e.g., print, scan, photocopy, fax, e-mail, and/or the like. In various embodiments, the MFP 22 is configured to at least print documents and scan documents.

Figure 2A:
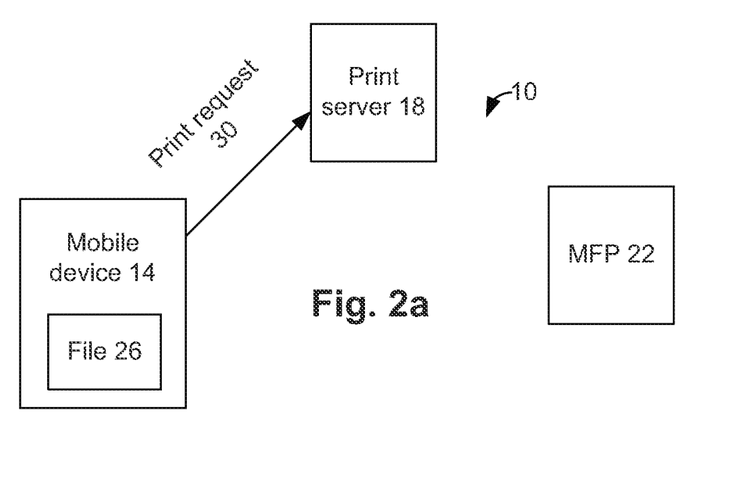
FIGS. 2a-2c schematically illustrate operation of the printing system of FIG. 1, in accordance with various embodiments of the present disclosure.
Figure 2B:
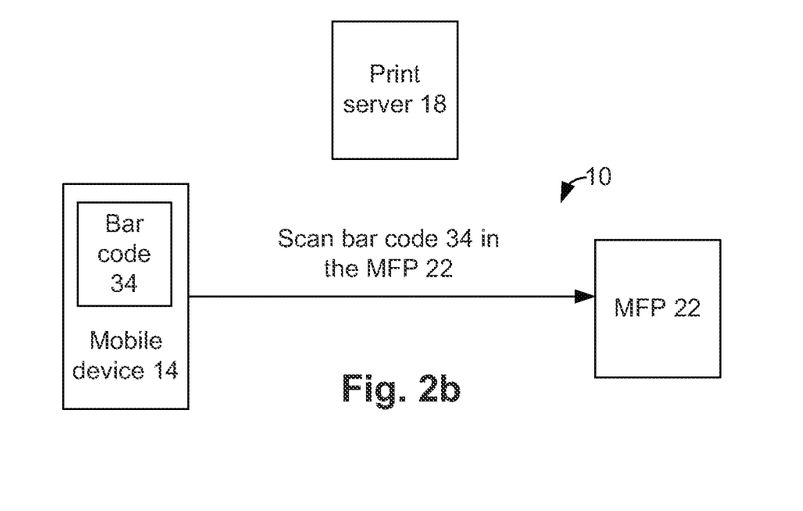
Figure 2C:
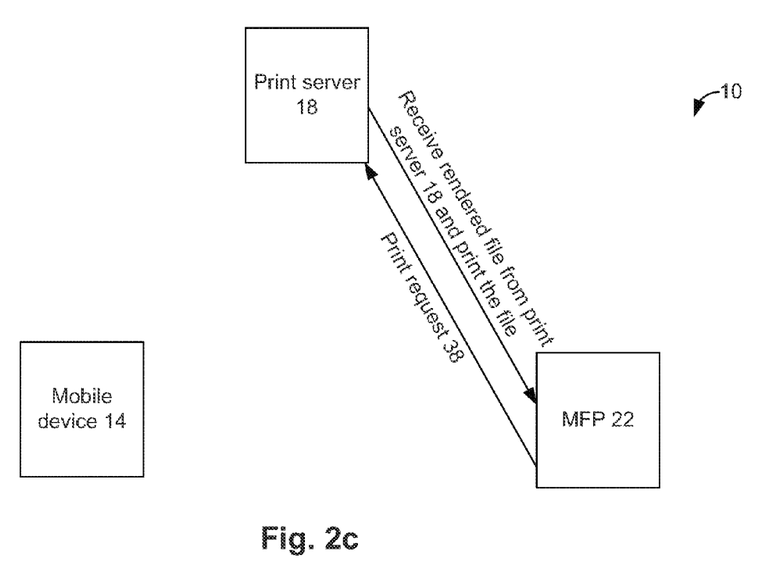

FIGS. 2a-2c schematically illustrate operation of the printing system 10 of FIG. 1, in accordance with various embodiments of the present disclosure. Referring to FIG. 2a, in an embodiment, the mobile device 14 accesses a file 26. For example, the mobile device 14 receives the file 26 from any appropriate source, e.g., from an e-mail (e.g., as an attachment) received by the mobile device 14, from a remote host through a network (e.g., the Internet, a WLAN, a PAN, etc.), from a consumer electronics device (e.g., a digital camera) operatively coupled to the mobile device 14, and/or the like. In another example, the mobile device 14 generates the file 26, e.g., by taking a picture using a camera that is built in the mobile device 14.

The file 26 has any appropriate format (or document type—e.g., .doc, .pdf, .jpg, .gif, and so on). For example, the file 26 can be a Microsoft Office® document, an Adobe Acrobat® document, an image file, or the like. In various use cases, a user of the mobile device 14 may want to print the file 26 (or a part of the file 26, e.g., one or more pages of the file 26). However, the format of the file 26 can be such that the mobile device 14 is unable to properly open the file 26 or render the file 26 on a display of the mobile device 14 due to, for example, lack of an appropriate application program installed in the mobile device 14. For example, the file 26 is a Microsoft Word® document, which the mobile device 14 is unable to properly open or render in its display (e.g., as a full version of Microsoft Office® is not installed in the mobile device 14). For at least these reasons, the mobile device 14 uses the print server 18 to print the file 26 to the MFP 22, as will be discussed in more detail herein.

For the purpose of this disclosure and unless otherwise mentioned, a reference to printing the file 26 indicates printing the entire file 26 (e.g., printing all pages included in the file 26) or printing only a part of the file 26 (e.g., printing one or more of the pages included in the file 26).

Referring again to FIG. 2*a*, to enable printing of the file 26, the mobile device 14 transmits a print request 30 to the print server 18. The print request 30 includes an identification of the file to be printed (i.e., file 26). In various embodiments, the print request 30 also indicates a portion of the file that is to be printed (e.g., page numbers of the file 26 that are to be printed), various print options associated with printing the file 26 (e.g., quality of printing, single sided or double sided printing, etc.), and/or the like. In various embodiments, the file 26 is also transmitted to the print server 18 as a part of the print request 30.

Although FIG. 2*a* illustrates the file 26 to be included (e.g., stored) in the mobile device 14, in various embodiments, the file 26 need not be physically stored in the mobile device 14. For example, while browsing the Internet using the mobile device 14, a user finds the file 26 at a website. Instead of downloading the file 26 in the mobile device 14, the user transmits the print request 30 to the print server 18 to print the file 26. In such a case, the print request 30 from the mobile device 14 to the print server 18 indicates an appropriate network path of the file 26, instead of transmitting the actual file 26 by the mobile device 14 to the print server 26 along with the print request 30.

In various embodiments, in response to receiving the print request 30 from the mobile device 14, the print server 18 verifies if the print server 18 has an appropriate application program installed, which is to be used to open and render the file 26 for printing. If such an appropriate application program is not installed in the print server 18, the print server 18, for example, notifies the mobile device 14 of its inability to render and print the file 26 and/or searches (e.g., searches over the Internet) for an appropriate program to open and render the file 26 for printing.

If an appropriate application program is installed in the print server 18, in response to receiving the print request 30, the print server 18 accesses the file 26 (e.g., from the print request 30 and/or from a network path indicated in the print request 30). The print server 18 then stores the file 26.

Referring again to FIG. 2*b*, in response to transmitting the print request 30 to the print server 18, a bar code 34 is displayed on the display of the mobile device 14. In an embodiment, the mobile device 14 generates the bar code based on transmitting the print request 30 to the print server 18. In another embodiment, the print server 18 generates the bar code 34 based on receiving the print request 30 and transmits the bar code 34 to the mobile device 14, which the mobile device 14 displays on its display. In yet another embodiment, the print server 18 transmits information to the mobile device 14 in response to receiving the print request 30 from the mobile device 14, and the mobile device 14 generates the bar code 34 based on receiving said information from the print server 18.

In an embodiment, the bar code 34 is, for example, a one dimensional bar code or a two dimensional bar code. In an example, the bar code identifies or includes information that identifies a network path to the printer server 18, the mobile device 14, a print job code associated with the print request 30, and/or the like. For example, the bar code indicates a Uniform Resource Locator (URL) that embeds such identification information.

As an example, the bar code 34 is a two dimensional bar code that indicates a URL http://www.example1.com/printserver,User#01234,Job#56789, where http://www.example1.com is a network path of the print server 18, the User number 01234 identifies the mobile device 14, and the print job code 56789 identifies the print request 30. However, it is noted that this format of the URL associated with the bar code 34 is only an example, and the bar code 34 can include information in any other appropriate format.

Subsequent to the display of the bar code 34 on the mobile device 14, the user of the mobile device 14 selects an MFP for printing the file 26. For example, the user of the mobile device 14 selects the MFP 22 for printing the file 26. As illustrated in FIG. 2*b*, the user scans the bar code 34 on the mobile device 14 in the MFP 22.

For example, the user of the mobile device 14 selects the MFP 22 for printing, based on proximity of the MFP 22 to a current location of the user. For example, if the user is in an office, the user selects an MFP that is near to a location of the user. In another example, the user selects an MFP that supports printing from a mobile device via a print server. In another example, the user selects an MFP that the user knows will not store or retain any information from the file 26 while printing the file 26. In another example, the user selects an MFP, which the user is authorized to use for printing. In yet another example, the user pays (e.g., have a paid subscription) for using one or more MFPs, and selects an MFP from the one or more MFPs.

Referring again to FIG. 2*c*, in response to scanning the bar code 34, the MFP 22 identifies information embedded in the bar code 34. For example, the MFP 22 identifies the network path of the print server 18, the print job code associated with the print request 30, and/or the like. The MFP 22 transmits a print request 38 to the print server 18, requesting the print server to stream the file 26 to the MFP 22 for printing in the MFP 22.

In various embodiments, in response to receiving the print request 38 from the MFP 22, the print server 18 verifies if the print server 18 has an appropriate print driver installed, which is necessary for printing on the MFP 22. If an appropriate print driver is not installed in the print server 18, the print server 18, for example, receives such a print driver from an appropriate source (e.g., another print server over a network, the MFP 22, and/or the like) and installs the print driver. Subsequently, the print server 18 opens the file 26 and renders the file 26 for printing. In various embodiments, the print server 18 renders the file 26 for printing based at least in part on various print options included in the print request 30 (e.g., number of pages to be printed, quality of printing, single sided or double sided printing, etc.). In various embodiments, the print server 18 maintains a log of its print activity, and/or archives the print jobs for subsequent possible re-print requests. Subsequently, the print server 18 streams the rendered version of the file 26 (e.g., as rendered by the print server 18) to the MFP 22, and the MFP 22 prints the file 26.

Although not illustrated in FIGS. 2a-2c, in various embodiments, the mobile device 14 uses a password to securely print the file 26 in the MFP 22. For example, in various embodiments, the mobile device 14 transmits a password along with the print request 30 to the print server 18. Alternatively, the print server 18 generates a password based on receiving the print request 30 and transmits the generated password to the mobile device 14. Subsequently, while scanning the bar code 34 in the MFP 22, the user of the mobile device 14 enters the password in the MFP 22, which the MFP 22 transmits to the print server 18 along with the print request 38. The print server 18 validates the print request 38 from the MFP 22 only if the password is correct.

In various embodiments, the mobile device 14 stores a log of one or more print requests it previously sent to the print server 18 and/or stores one or more bar codes it previously used for printing various files in the past. If the user of the mobile device 14 wants to re-print a previously printed file, the user uses a previously stored bar code or print request to print the file.

Figure 3:
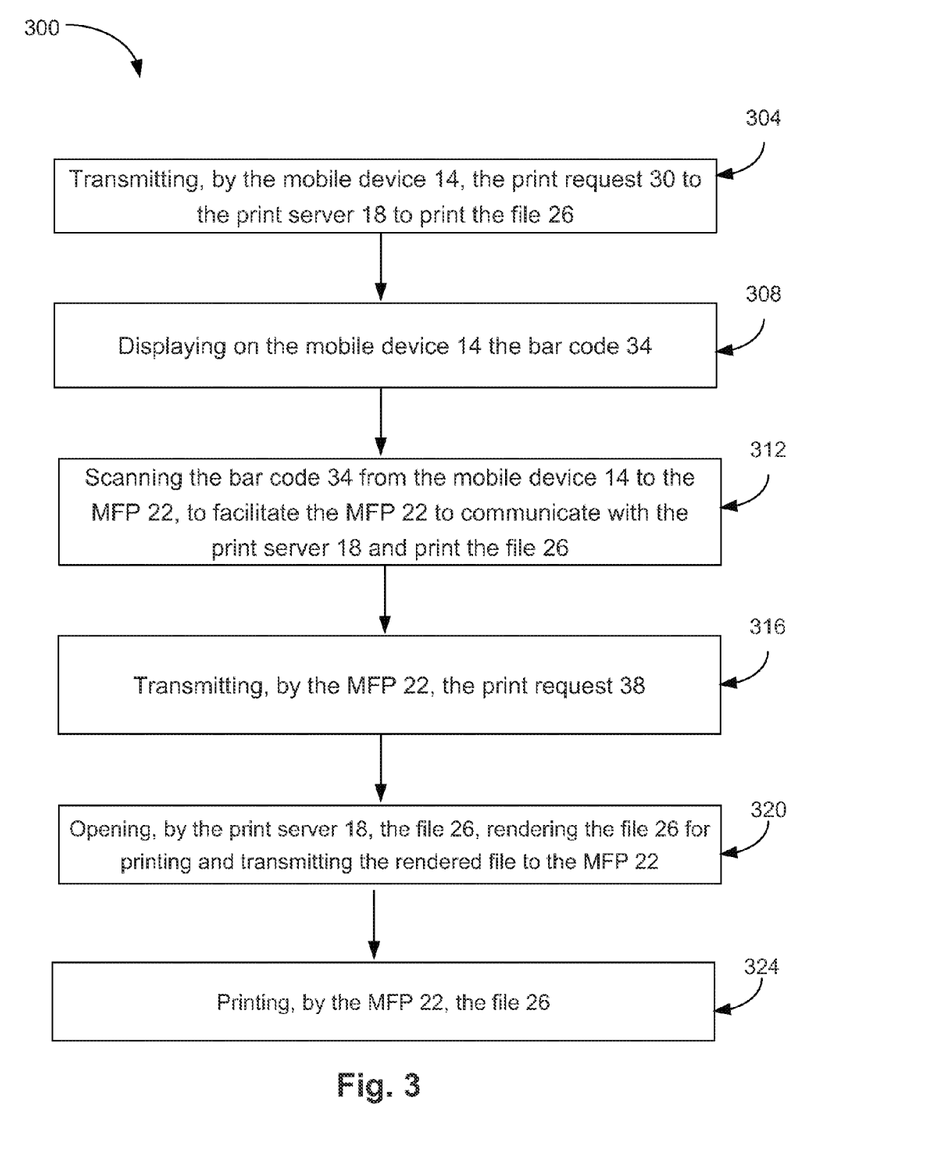
FIG. 3 is a flowchart describing a method for operating the printing system of FIG. 1, in accordance with various embodiments of the present disclosure.

FIG. 3 is a flowchart describing a method 300 for operating the printing system 10 of FIG. 1, in accordance with various embodiments of the present disclosure. Referring to FIGS. 1, 2a-2c and 3, at 304, the mobile device 14 transmits the print request 30 to the print server 18 to print the file 26. At 308, the mobile device 14 displays the bar code 34 on its display. At 312, the bar code 34 from the mobile device 14 is scanned to the MFP 22 (e.g., by a user of the mobile device 14), to facilitate the MFP 22 to communicate with the print server 18 and to print the file 26. At 316, the MFP 22 transmits the print request 38 to the print server 18. At 320, the print server 18 opens the file 26, renders the file 26 for printing and transmits the rendered file to the MFP 22. At 324, the MFP 22 receives the rendered file and prints the file 26.

Printing files from the mobile device 14 using the printing system 10 has several advantages. For example, the printing system 10 enables the mobile device 14 to print files that otherwise cannot be opened (or rendered for printing) by the mobile device 14. Furthermore, although FIGS. 1, 2a-2c illustrate printing the file 26 in MFP 22, in various embodiments, the user of the mobile device 14 can select any accessible MFP (e.g., any MFP that supports printing from the print server 18) for printing the file 26. The user of the mobile device 14 does not need to remember any particular MFP address and/or location for printing the file 26, and the mobile device 14 is not tied to any particular printer. Furthermore, the previously discussed password feature ensures that files are securely printed in the MFP 22.

Figure 4:
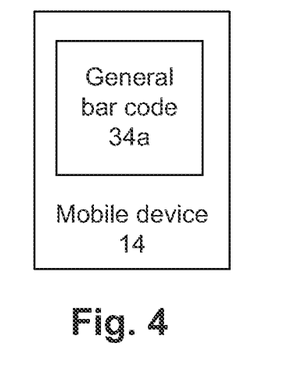
FIG. 4 illustrates a general bar code displayed on a display of the mobile device of the FIG. 1, in accordance with various embodiments of the present disclosure.

As previously discussed herein, the barcode 34 of FIG. 2b is specifically associated with the print request 30 and specifically for printing the file 26. However, in various other embodiments, the mobile device 14 displays a bar code that can be used for printing multiple files from the mobile device 14 to the MFP 22. For example, as illustrated in FIG. 4, the mobile device 14 (or the print server 18) generates a general bar code 34a that uniquely identifies the print server 18 and/or the mobile device 14 (but does not identify any specific file for printing or any specific print request from the mobile device 14 to the print server 18).

The mobile device 14 transmits multiple print requests for printing multiple files to the print server 18, each associated with the general bar code 34a. As an example, whenever the user of the mobile device 14 scans the general bar code 34a in the MFP 22, the MFP 22 receives identification of all the print jobs from the print server 18. The MFP 22 then provides the user an option to select and print files associated with one or more of the print jobs. In another example, whenever the user of the mobile device 14 scans the general bar code 34a in the MFP 22, the MFP 22 prints all the files that were received by the print server 18 from the mobile device 14 and that have not been printed yet.

The general bar code 34a, thus, enables the mobile device 14 to use a single bar code to identify and retrieve multiple print jobs from the print server 18 to the MFP 22. This is advantageous when there are multiple files that are to be printed from the mobile device 14.

Figure 5:
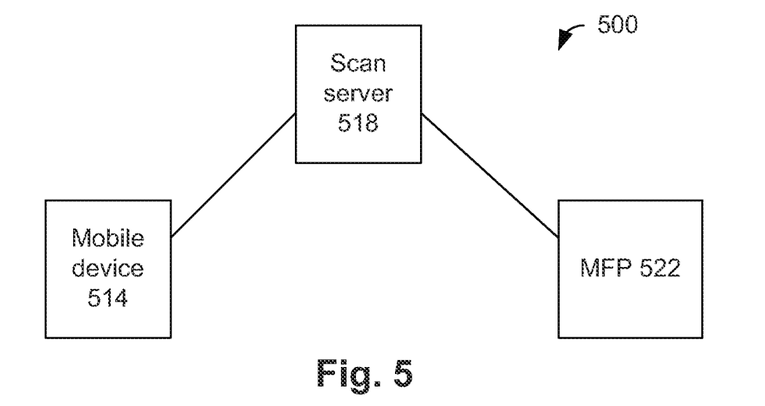
FIG. 5 schematically illustrates a scanning system used for scanning to a mobile device, in accordance with various embodiments of the present disclosure.

FIG. 5 schematically illustrates a scanning system 500 used for scanning to a mobile device 514, in accordance with various embodiments of the present disclosure. The scanning system 500 includes the mobile device 514 and a MFP 522, which are, in various embodiments, at least in part similar to the mobile device 14 and MFP 22, respectively, of FIG. 1. In various other embodiments and although not illustrated in FIG. 5, a scanner can be used instead of the MFP 522 in the scanning system 500.

The mobile device 514 is operatively coupled to, and communicates with a scan server 518. In an embodiment, the mobile device 514 is operatively coupled to the scan server 518 through a network, e.g., the Internet, a LAN, a WLAN, a PAN, and/or the like. In various embodiments, a single print and scan server can serve as the print server 18 of FIG. 1 and as the scan server 518 of FIG. 5.

Figure 6A:
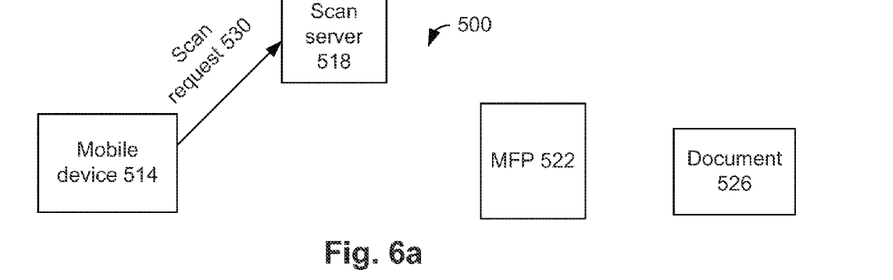
FIGS. 6a-6c schematically illustrate operation of the scanning system of FIG. 5, in accordance with various embodiments of the present disclosure.
Figure 6B:
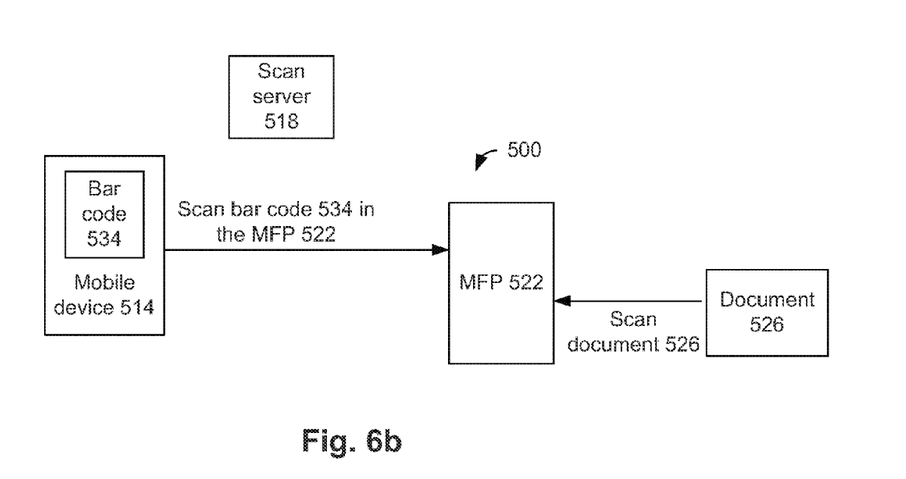
Figure 6C:
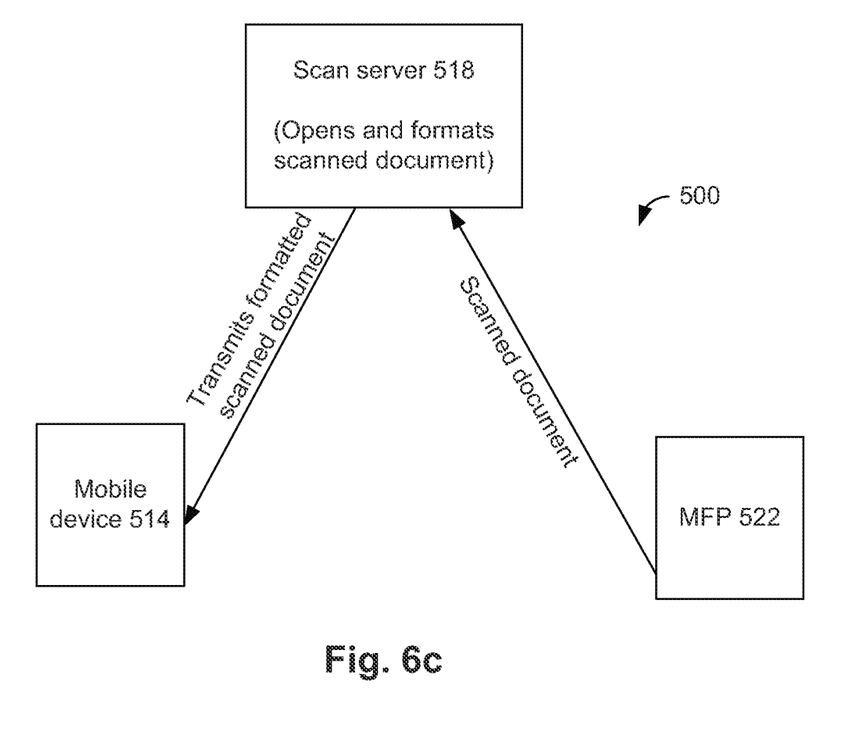

FIGS. 6a-6c schematically illustrate operation of the scanning system 500 of FIG. 5, in accordance with various embodiments of the present disclosure. Referring to FIG. 5a, in an embodiment, the user of the mobile device 514 wants to scan a document 526 using the MFP 522, and access the scanned document in the mobile device 514. The document 526 comprises, for example, one or more printed pages.

The MFP 522 does not have a direct communication link with the mobile device 514. Furthermore, the format in which the document is scanned in the MFP 522 may not be compatible with the mobile device 514. As an example, the MFP 522 stores a scanned document as an Adobe Acrobat® file, which the mobile device 514 is unable to open. For these reasons, the mobile device 514 receives the scanned document from the MFP 522 through the scan server 518, as will be discussed in more detail herein later.

Referring again to FIG. 6a, to enable scanning of the document 526, the mobile device 514 transmits a scan request 530 to the scan server 518. The scan request 530 includes, for example, various scan options, e.g., number of pages to be scanned, scan color (monochrome or color), scan quality, scan mode, etc. The scan request 530 also includes, for example, one or more file formats supported by the mobile device 514 (e.g., .jpg, .jpeg, .pdf, etc.), so that the scan server 518 can send the scanned document in an appropriate format to the mobile device 514. The scan request 530 also includes, for example, a scan job identification number and an identification of the mobile device 514. In various embodiments, subsequent to receiving the scan request 530, the scan server 518 stores the scan request 530.

In various embodiments, in response to receiving the scan request 530 from the mobile device 514, the scan server 518 verifies if the scan server 518 has appropriate application program installed, in which a scanned document has to be formatted before transmitting to the mobile device 514. If such an appropriate application program is not installed in the scan server 518, the scan server 518, for example, notifies the mobile device 514 of its inability to scan documents and/or searches (e.g., searches over the Internet) for an appropriate application program.

Referring again to FIG. 2b, subsequent to transmitting the scan request 530 to the scan server 518, a bar code 534 is displayed on the display of the mobile device 514. In an embodiment, the mobile device 514 generates the bar code 534 based on transmitting the scan request 530 to the scan server 518. In another embodiment, the scan server 518 generates the bar code 534 based on receiving the scan request 530 and transmits the bar code 534 to the mobile device 514, which the mobile device 514 displays on its display.

The bar code 534 is, for example, a one dimensional bar code or a two dimensional bar code. In an example, the bar code identifies or includes information that identifies network paths to the scan server 518 and the mobile device 514, a scan job code associated with the scan request 530, and/or the like. For example, the bar code indicates a Uniform Resource Locator (URL) that includes such identification information.

As an example, the bar code 534 is a two dimensional bar code that indicates a URL http://www.example2.com/scan-server,User#12345,Job#67890, where http://www.example2.com is a network path of the scan server 518, the User number 12345 identifies the mobile device 514, and the scan job code 67890 identifies the scan request 530. However, it is noted that this format of the URL associated with the bar code 534 is only an example, and the bar code 534 can include information in any other appropriate format.

Subsequent to the display of the bar code 534 on the mobile device 514, the user of the mobile device 534 selects an MFP or a scanner for scanning the document 526. For example, the user of the mobile device 514 selects the MFP 522 for scanning the document 526. As illustrated in FIG. 2b, the user scans the bar code 534 displayed on the mobile device 514 in the MFP 522. In response to scanning the bar code 534, the MFP 522 identifies information embedded in the bar code 534. For example, the MFP 522 identifies the network path of the scan server 18, the scan job code associated with the scan request 530, and/or the like. Subsequently, the user scans the document 526 in the MFP 522, as illustrated in FIG. 6b.

Referring now to FIG. 6c, once the document 526 is scanned in the MFP 522, the MFP 522 transmits the scanned document to the scan server 518. In various embodiments, the MFP 522 also transmits, along with the scanned document, an identification of the scan job code to the scan server 518, to enable the scan job server 518 to correlate the scanned document with the scan request 530 received from the mobile device 514.

In various embodiments, in response to receiving the scanned document from the MFP 522, the scan server 518 verifies if the scan server 518 has appropriate scan driver and/or application program installed, which are necessary for opening and/or formatting the scanned document from the MFP 522. If appropriate scan driver and/or application program are not installed in the scan server 518, the scan server 518, for example, receives such scan driver and/or application program from an appropriate source (e.g., another scan server over a network, the MFP 522, and/or the like) and installs the same in the scan server 518.

As illustrated in FIG. 6c, based on receiving the scanned document, the scan server 518 opens the scanned document and formats the scanned document (e.g., based on various scan options received in the scan request 530) such that the mobile device 514 is able to open and/or view the formatted scanned document. In various embodiments, the scan server 518 maintains a log of its scanning activity, and/or archives the scan jobs for subsequent possible re-scanning requests. Subsequently, the scan server 518 transmits the formatted scanned document to the mobile device 514, which the mobile device 514 can open and render on its display.

Figure 7:
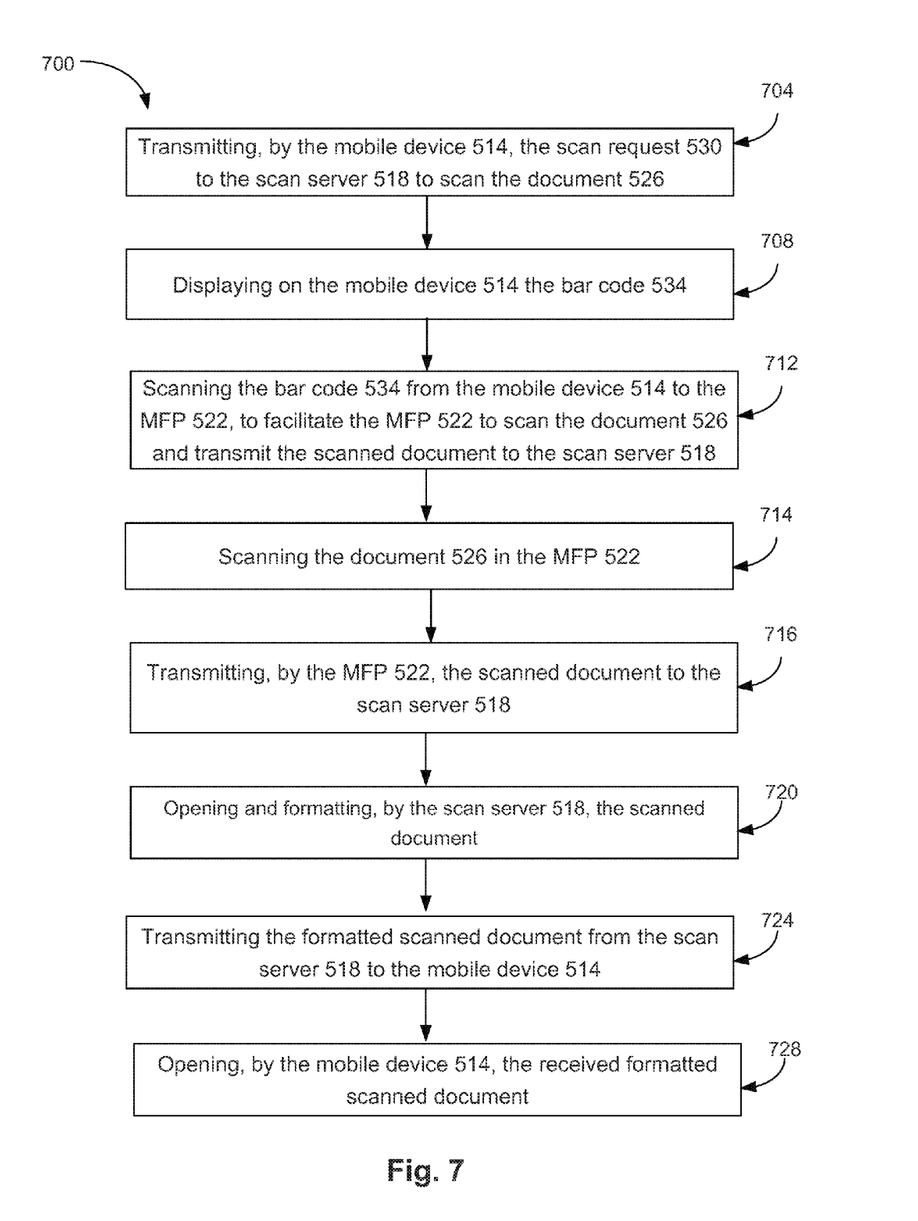
FIG. 7 is a flowchart describing a method for operating the scanning system of FIG. 5, in accordance with various embodiments of the present disclosure.

FIG. 7 is a flowchart describing a method 700 for operating the scanning system 500 of FIG. 5, in accordance with various embodiments of the present disclosure. Referring to FIGS. 5, 6a-6c and 7, at 704, the mobile device 514 transmits the scan request 530 to the scan server 518 to scan the document 526. At 708, the bar code 534 is displayed on the display of the mobile device 514. At 712, the bar code 534 from the mobile device 514 is scanned to the MFP 522, to facilitate the MFP 522 to scan the document 526 and transmit the scanned document to the scan server 518. At 714, the document 526 is scanned in the MFP 522. At 716, the MFP 522 transmits the scanned document to the scan server 518. At 720, the scan server 518 opens and formats the received scanned document so that the scanned document is in a format that is compatible with the mobile device 514 (e.g., so that the mobile device 514 can open and view the scanned document). At 724, the scan server transmits the scanned document to the mobile device 514. At 728, the mobile device 514 opens the received formatted scanned document and views the opened document on its display.

Scanning documents to the mobile device 514 using the scanning system 500 has several advantages. For example, the scanning system 500 enables the mobile device 514 to view scanned documents that otherwise cannot be opened by the mobile device 514 (e.g., due to lack of a direct connection between the MFP 522 and the mobile device 518, and/or due to lack of an appropriate application program in the mobile device 514 to open and view a document scanned by the MFP 522). Furthermore, although FIGS. 5 and 6a-6c illustrate scanning the document 526 in the MFP 522, in various embodiments, the user of the mobile device 514 can select any accessible MFP and/or scanner (e.g., any MFP and/or scanner that supports communicating with the scan server 518) for scanning the document 526. The user of the mobile device 514 does not need to remember any particular MFP and/or scanner address for scanning the document 526, and the mobile device 514 is not tied to any particular scanner.

Figure 8:
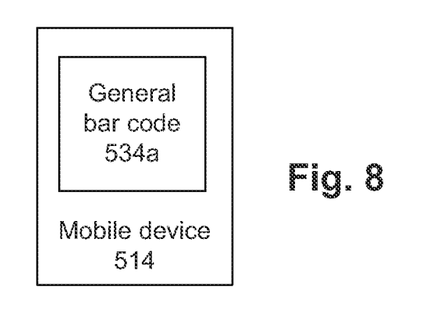
FIG. 8 illustrates a general bar code displayed on a display of the mobile device of the FIG. 5, in accordance with various embodiments of the present disclosure.

As previously discussed herein, the barcode 534 of FIG. 6b is specifically associated with the scan request 530. However, in various other embodiments, the mobile device 514 displays a bar code that can be used for scanning multiple documents from the MFP 522 to the mobile device 514. For example, as illustrated in FIG. 8, the mobile device 514 (or the scan server 518) generates a general bar code 534a that uniquely identifies the scan server 518 and/or the mobile device 514 (but does not identify any specific scan request from the mobile device 514 to the scan server 518).

In various embodiments, whenever the general bar code 534a is scanned in the MFP 522, the MFP 522 scans one or more documents and transmits the scanned documents to the scan server 518. Thus, the general bar code 534a enables the scan server 518 to identify and transmit all the scanned documents, received from the MFP 522 (or any other MFP), to the mobile device 514. This is advantageous when there are multiple documents that are to be scanned to the mobile device 514.

Figure 9:
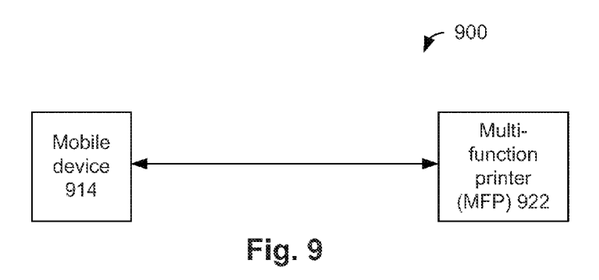
FIG. 9 schematically illustrates a printing system used for printing from a mobile device to a multi-function printer, in accordance with various embodiments of the present disclosure.

FIG. 9 schematically illustrates a printing system 900 used for printing from a mobile device 914 to a MFP 922, in accordance with various embodiments of the present disclosure. In various embodiments, the mobile device 914 is at least in part similar to the mobile device 14 of FIG. 1, and the MFP 922 is at least in part similar to the MFP 22 of FIG. 1.

Figure 10:
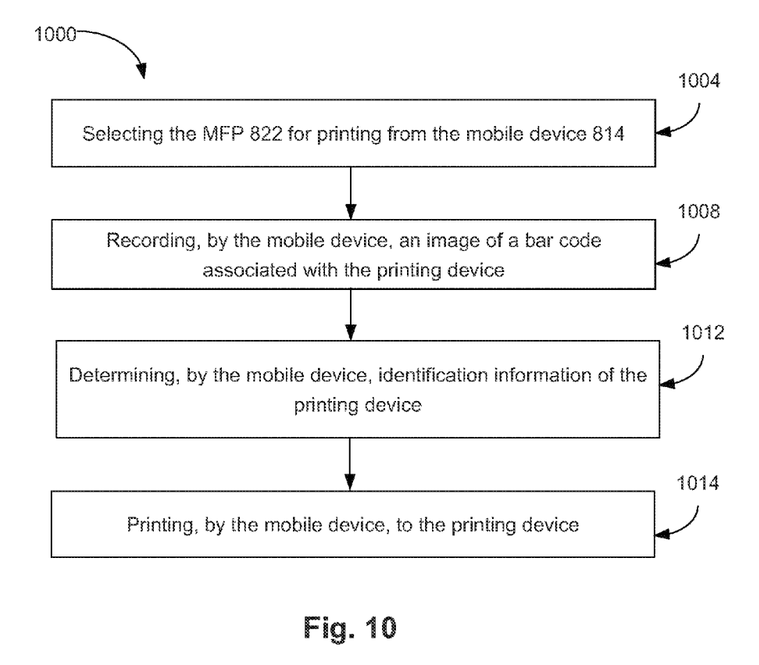
FIG. 10 is a flowchart describing a method for operating the printing system of FIG. 8, in accordance with various embodiments of the present disclosure.

FIG. 10 is a flowchart describing a method 1000 for operating the printing system 900 of FIG. 9, in accordance with various embodiments of the present disclosure. Referring to FIGS. 9 and 10, at 1004, the MFP 922 is selected (e.g., by a user of the mobile device 914) for printing from the mobile device 914. For example, the user of the mobile device 914 selects the MFP 922 for printing, based on a proximity of the MFP 922 to a current location of the user. For example, if the user is in an office, the user selects a printing device (e.g., the MFP 922) that is near to a location of the user.

In various embodiments, the MFP 922 includes a display, and the user of the mobile device 914 configures the MFP 922 (e.g., by pressing a configuration button of the MFP 922) such that the MFP 922 displays a bar code associated with the MFP 922. In various other embodiments, the user prints a configuration page from the MFP 922, and the configuration page includes the bar code associated with the MFP 922.

At 1008, the mobile device 914 records an image of the bar code associated with the MFP 922. For example, the mobile device 914 takes a picture of the bar code (using a camera that is built in the mobile device 922) of the bar code from the display of the MFP 922 and/or from the configuration page printed from the MFP 922.

In various embodiments, the bar code embeds information about the MFP 922, e.g., identification information of the MFP 922, one or more settings of the MFP 922, and/or the like. At 1012, the mobile device 922 determines, from the image of the bar code, identification information (and/or any other useful information) of the MFP 922. At 1014, based at least in part on the identification information of the MFP 922, the mobile device 914 prints to the MFP 922.

For example, the identification information of the MFP 922 includes a Uniform Resource Identifier (URI) of the MFP 922, an Internet Protocol (IP) address of the MFP 922, and/or the like. The mobile device 914 uses this identification information to transmit print job from the mobile device 914 to the MFP 922. In various embodiments, the bar code is, for example, a one dimensional bar code or a two dimensional bar code. In an example, the bar code is a two dimensional bar code that embeds the URI and/or the IP address of the MFP 922.

In various embodiments, the identification information of the MFP 922 is periodically updated (e.g., the MFP 922 is assigned a dynamic IP address). In such situations, the bar code associated with the MFP 922 is also updated periodically (e.g., whenever the identification information is updated) so that the bar code reflects the current identification information of the MFP 922.

Although not illustrated in FIGS. 9 and 10, in various embodiments, the mobile device 914 prints to the MFP 922 using a print server (e.g., at least in part similar to the print server 18 of FIG. 1). For example, the mobile deice 914 transmits a print request to the print server, where the print request includes the identification information of the MFP 922. Subsequently, based on the identification information, the print server communicates with the MFP 922 (e.g., as previously discussed herein), and prints to the MFP 922.

There are various advantages of the printing system 900. For example, in the method 1000, the user of the mobile device 914 does not need to manually enter, or even be aware of the IP address and/or the URI of the MFP 922, as the mobile device 914 determines such identification information directly from the image of the bar code.

In accordance with various embodiments, articles of manufacture may be provided that include storage mediums having instructions stored thereon that, if executed, result in the operations described herein with respect to FIGS. 3, 7 and/or 9. For example, such storage mediums may be stored in each of the mobile devices 14, 514 and 814, print server 18, scan server 518, and/or MFPs 22, 522 and 822. In an embodiment, each of the storage mediums comprises some type of memory (not shown). In accordance with various embodiments, the articles of manufacture may be computer-readable mediums such as, for example, software or firmware.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
    transmitting, by a mobile device, a first print request to a print server to print a first file;
    in response to transmitting the first print request, displaying on the mobile device a bar code, wherein the bar code includes information embedded in the bar code;
    subsequent to transmitting the first print request, transmitting, by the mobile device, a second print request to the print server to print a second file; and
    scanning, at a printing device, the bar code displayed on the mobile device, wherein the scanning of the bar code at the printing device facilitates subsequent printing of both of the first file and the second file by the printing device, based on the information embedded in the bar code.

2. The method of claim 1, wherein the bar code embeds identification information associated with one or both of the print server and the mobile device.

3. The method of claim 1, wherein the scanning of the bar code at the printing device further comprises:
    scanning the bar code at the printing device, to facilitate the printing device to transmit a third print request to the print server,
    in response to transmitting the third print request, receive a formatted version of both of the first file and the second file from the print server, and
    print the formatted version of both of the first file and the second file.

4. The method of claim 1, wherein subsequent to scanning, at the printing device, the bar code displayed on the mobile phone, the print server is configured to:
    receive a third print request from the printing device;
    in response to receiving the third print request, open and format both of the first file and the second file for printing in the printing device; and
    transmit the formatted both of the first file and the second file to the printing device.

5. The method of claim 1, wherein:
the first file is stored in a location that is external to the mobile device; and
the first print request includes location information of the first file.

6. The method of claim 1, wherein the first print request includes one or more print options associated with printing the first file.

7. The method of claim 1, wherein the bar code is a first bar code, and wherein the method further comprises:
transmitting, by the mobile device, a third print request to the print server to print a third file;
in response to transmitting the third print request, displaying on the mobile device a second bar code; and
scanning, at a printing device, the second bar code displayed on the mobile device, wherein scanning the second bar code displayed on the mobile device facilitates the printing device to communicate with the print server and print the third file.

8. The method of claim 1, further comprising:
generating a password associated with the first print request; and
in response to scanning the bar code, inputting the password in the printing device, to facilitate authentication of the printing device to the print server.

9. The method of claim 1, wherein subsequent to scanning, at the printing device, the bar code displayed on the mobile phone, the printing device is configured to:
display, to a user of the mobile device, an option for the user to select both of the first file and the second file;
receive a selection from the user of both of the first file and the second file; and
based on the selection from the user, print both of the first file and the second file.

10. The method of claim 1, wherein subsequent to scanning, at the printing device, the bar code displayed on the mobile phone, the printing device is configured to:
receive from the print server a plurality of files associated with a plurality of print requests, wherein the plurality of print requests were transmitted to the print server by the mobile device, wherein the plurality of print requests includes the first print request and the second print request, and wherein the plurality of files includes the first file and the second file; and
print one or more of the plurality of files by the printing device.

11. The method of claim 1, wherein the bar code does not include identification information associated with each of the first file and the second file.

12. The method of claim 1, wherein the first print request includes the first file.

13. The method of claim 1, wherein the bar code is generated by the mobile device in response to the mobile device transmitting the first print request to the print server.

14. The method of claim 13, wherein the bar code is not received by the mobile device from the print server.

* * * * *